US012489214B2

(12) United States Patent
Chen et al.

(10) Patent No.: US 12,489,214 B2
(45) Date of Patent: Dec. 2, 2025

(54) ANTENNA FEED AND ANTENNA INCLUDING THE ANTENNA FEED

(71) Applicants: PROSE TECHNOLOGIES (SUZHOU) CO., LTD., Suzhou (CN); PROSE TECHNOLOGIES LLC, Mount Olive, NJ (US)

(72) Inventors: Pengyu Chen, Suzhou (CN); Lei Wang, Suzhou (CN)

(73) Assignees: PROSE TECHNOLOGIES (SUZHOU) CO., LTD., Suzhou (CN); PROSE TECHNOLOGIES LLC, Mount Olive, NJ (US)

( * ) Notice: Subject to any disclaimer, the term of this patent is extended or adjusted under 35 U.S.C. 154(b) by 191 days.

(21) Appl. No.: 18/366,270

(22) Filed: Aug. 7, 2023

(65) Prior Publication Data

US 2024/0030612 A1 Jan. 25, 2024

Related U.S. Application Data

(63) Continuation of application No. PCT/CN2023/078082, filed on Feb. 24, 2023.

(30) Foreign Application Priority Data

Jul. 22, 2022 (CN) ......................... 202210870811.1

(51) Int. Cl.
*H01Q 13/02* (2006.01)
*H01Q 1/36* (2006.01)
(Continued)

(52) U.S. Cl.
CPC ............... *H01Q 13/06* (2013.01); *H01Q 1/36* (2013.01); *H01Q 15/16* (2013.01)

(58) Field of Classification Search
CPC .......... H01Q 1/36; H01Q 13/00; H01Q 13/06; H01Q 15/16; H01Q 19/13; H01Q 19/134
See application file for complete search history.

(56) References Cited

U.S. PATENT DOCUMENTS 3,055,004 A * 9/1962 Cutler ................ H01Q 13/0208 343/781 R
4,622,559 A * 11/1986 Shafai .................. H01Q 13/065 343/786
(Continued)

FOREIGN PATENT DOCUMENTS

CN 211700555 U 10/2020
CN 112018522 A 12/2020
(Continued)

*Primary Examiner* — Tho G Phan
(74) *Attorney, Agent, or Firm* — ANOVA LAW GROUP, PLLC

(57) ABSTRACT

An antenna feed includes a waveguide, a medium support block, and a reflection surface, a smaller end of the medium support block is connected to the waveguide, the reflective surface contacts the inner surface, where the inner surface has at least first, second and third wall segments, where a distance of the second wall segment to the longitudinal axis is greater than a distance of the third wall segment to the longitudinal axis and is smaller than a distance of the first wall segment to the longitudinal axis, where a first angle is defined between the first wall segment and the longitudinal axis, a second angle is defined between the second wall segment and the longitudinal axis, a third angle is defined between the third wall segment and the longitudinal axis, and the second angle is greater than the first angle and greater than the third angle.

19 Claims, 4 Drawing Sheets

(51) Int. Cl.
*H01Q 13/06* (2006.01)
*H01Q 15/16* (2006.01)

(56) References Cited

U.S. PATENT DOCUMENTS

| | | | | |
|---|---|---|---|---|
| 4,797,684 | A * | 1/1989 | Bernstein | H01Q 9/27 343/822 |
| 6,844,862 | B1 | 1/2005 | Cencich et al. | |
| 8,730,119 | B2 * | 5/2014 | Runyon | H01Q 13/025 343/756 |

FOREIGN PATENT DOCUMENTS

| | | | |
|---|---|---|---|
| CN | 115173059 | A | 10/2022 |
| CN | 217740784 | U | 11/2022 |

* cited by examiner

ANTENNA FEED AND ANTENNA INCLUDING THE ANTENNA FEED

RELATED APPLICATION(S)

This application is a continuation application of PCT Patent Application No. PCT/CN2023/078082, filed on Feb. 24, 2023, which claims priority to Chinese Patent Application No. 202210870811.1 filed with the National Intellectual Property Administration, People's Republic of China on Jul. 22, 2022, all of which are incorporated herein by reference in entirety.

FIELD OF THE TECHNOLOGY

The present disclosure relates to microwave communication antennas, and more particularly to an antenna feed and an antenna including the antenna feed.

BACKGROUND

In order to form a reflector antenna for transmitting wireless signals, both the feed-forward reflector antenna and the feed-back reflector antenna desire a well-designed antenna feed.

In certain existing technologies, the diameter of the medium support block included in the antenna feed is greater than or equal to twice the wavelength corresponding to the working frequency of the antenna feed. At the same time, the diameter of the reflective surface included in the antenna feed is greater than or equal to twice the wavelength corresponding to the working frequency of the antenna feed. In addition, the outer diameter of the medium support block is equipped with multiple annular grooves or teeth.

Such design according to certain existing technologies may make the antenna feed larger in size, which in turn causes the antenna feed to consume more materials, to bear more weight, and to cost more, and may also make the antenna feed weaker in structural strength and more prone to damage.

SUMMARY

In view of an understanding of the problems existing in the background technology, that is, certain existing antenna feeds are large in size and poor in performance, the present disclosure in certain embodiment(s) provides a medium support block, the shape of which is similar to that of a water cup, and the body of the cup is cylindrical. This water cup configuration likely removes the annular groove provided in the medium support block in certain existing technology, thereby reducing the structural risk and the risk of medium cracking caused by stress release, thereby reducing the processing difficulty and cost and improving the batch yield.

According to certain embodiment(s) of the present disclosure, a maximum diameter of the medium support block is not greater than twice the wavelength corresponding to the operating frequency at which the antenna feed works, which reduces the diameter of the material forming the medium support block and reduces the material cost of the feed; at the same time, the radiation performance of the antenna feed according to the present disclosure is also desirable.

A first aspect of the present disclosure provides an antenna feed, and the antenna feed includes:

- a waveguide, configured to electrically connect a signal to be transmitted;
- a medium support block, a first end of the medium support block being connected to the waveguide, and an a second end of the medium support block defines an inner surface, the medium support block having a longitudinal axis; and
- a reflective surface configured to contact the inner surface, where in a longitudinal cross-section of the medium support block, the inner surface has at least a first wall segment, a second wall segment, and a third wall segment at one side of the longitudinal axis, where a distance of the second wall segment to the longitudinal axis is greater than a distance of the third wall segment to the longitudinal axis and is smaller than a distance of the first wall segment to the longitudinal axis, and where a first angle is defined between the first wall segment and the longitudinal axis, a second angle is defined between the second wall segment and the longitudinal axis, a third angle is defined between the third wall segment and the longitudinal axis, and the second angle is greater than the first angle and greater than the third angle.

In the antenna feed according to certain embodiment(s) of the present disclosure, since the inner surface of the medium support block is provided with at least three sections of wall shapes, and the smallest angle in the second angular range is greater than the largest angle in the first angular range and greater than the largest angle in the third angular range, such that the inner surface of the medium support block 100 formed to be steep first, then sloped, and then steeper again. Such a shape arrangement reduces the size of the medium support block while maintaining the signal transmission performance.

In certain embodiment(s), the first angle range includes an angle range of 0 degrees to 10 degrees, for example, an angle of 6 degrees. In certain embodiment(s), the third angle range includes an angle range of 0 degrees to 15 degrees, for example, an angle of 8 degrees. In certain embodiment(s), the second angle range includes an angle range of 20 degrees to 80 degrees, for example, an angle of 60 degrees.

In certain embodiment(s), a transverse cross-section of the medium support block is circular or annular. In certain embodiment(s), on an area outside where the inner surface is located, the transverse cross-section of the medium support block is circular in shape, correspondingly, above the area where the inner surface is located, a transverse cross-section of the medium support block is annular in shape.

In certain embodiment(s), the inner surface has a flat bottom surface. In certain embodiment(s), a maximum diameter of the medium support block is not greater than twice the wavelength corresponding to a working frequency where the antenna feed works.

In certain embodiment(s), parts of different wall segments of the medium support block are respectively configured as independent components. Those skilled in the art should understand that the medium support blocks may be constructed independently of each other and then assembled; they can also be constructed integrally.

In certain embodiment(s), the reflective surface includes a metal or is made of a metal material. In this manner, on the one hand, the structural strength of the antenna feed may be enhanced, and on the other hand, the signal transmission performance of the antenna feed may also be improved.

In certain embodiment(s), the second wall segment includes a plurality of wall sub-segments.

In certain embodiment(s), the first wall segment, the second wall segment, and/or the third wall segment include a line segment or a curve segment.

In certain embodiment(s), the line segment is straighter than a curve segment.

A second aspect of the present disclosure provides an antenna, including:

an antenna feed according to the first aspect of the present disclosure; and a main reflection surface, where the main reflection surface includes a curved surface, and the antenna feed is positioned at the curved surface of the main reflection surface.

In certain embodiment(s), the antenna further includes: a radio frequency connector, which is configured to be connected to the antenna feed and via which a signal to be transmitted by the antenna is connected to the antenna feed.

In certain embodiment(s), the reflective surface of the antenna feed is includes a metal and is realized by electroplating metal or metal paint on the inner surface or by placing a metal block that fits the concave surface.

In certain embodiment(s), the antenna is configured as a feed-back reflector antenna.

In the antenna feed according to certain embodiment(s) of the present disclosure, since the inner surface of the medium support block 100 is provided with at least three sections of wall shapes, and the smallest angle in the second angular range is greater than the largest angle in the first angular range and greater than the largest angle in the third angular range, such that the inner surface of the medium support block is formed to be steep first, then sloped, and then steeper again. Such a shape arrangement reduces the size of the medium support block while maintaining the signal transmission performance.

BRIEF DESCRIPTION OF THE DRAWINGS

Embodiments are shown and explained with reference to the drawings. The drawings serve to clarify the basic principles and show certain aspects which are helpful for understanding the basic principles. The drawings are not necessarily to scale. In the drawings, the same reference numerals may denote similar features.

Figure 1:
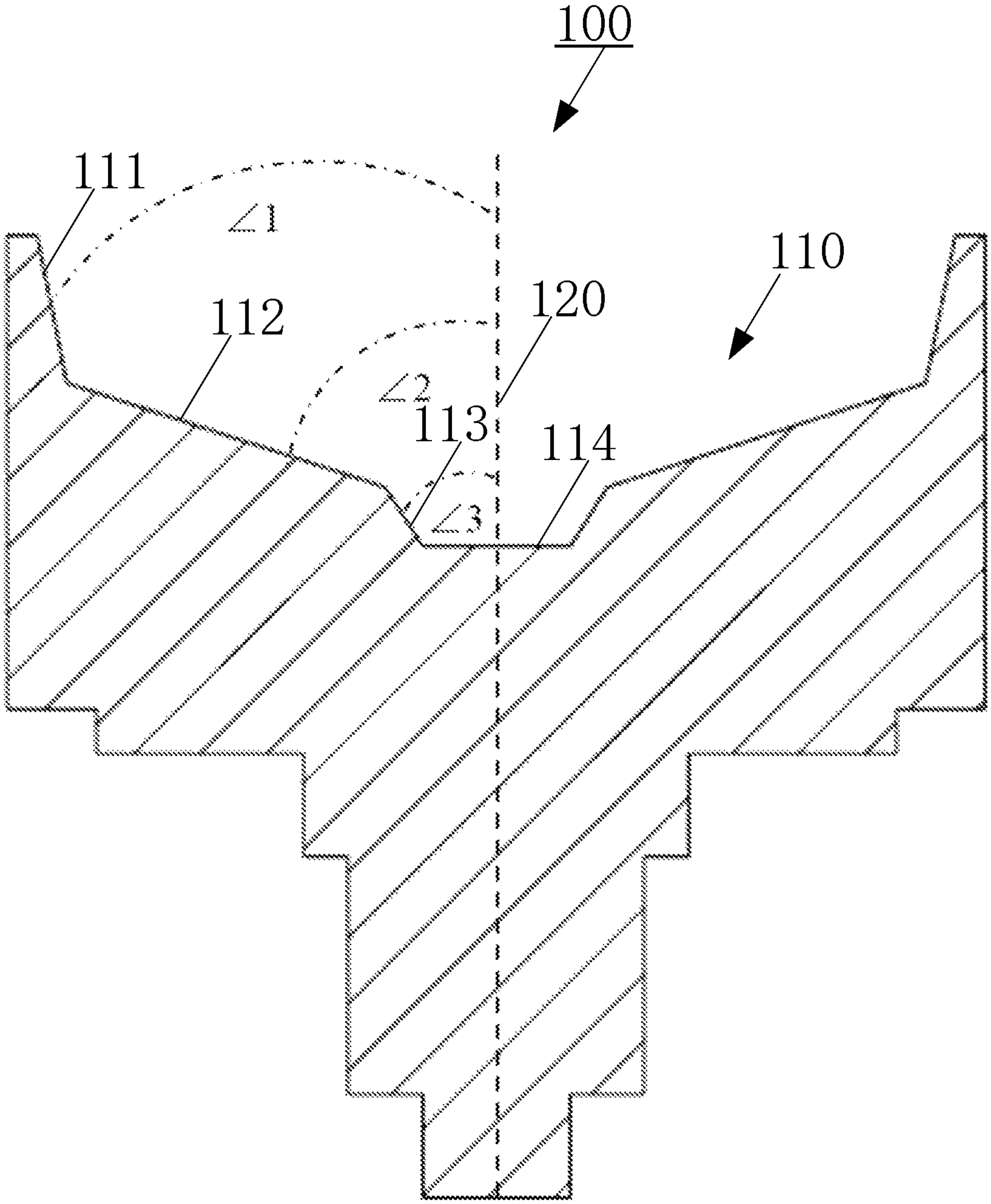
FIG. 1 shows a schematic structural diagram of a medium support block 100 included in an antenna feed according to certain embodiment(s) of the present disclosure.

Other features, features, advantages and benefits of the present disclosure may become more apparent from the following detailed description when taken in conjunction with the accompanying drawings.

DETAILED DESCRIPTION

In the following detailed description of certain embodiments, reference is made to the accompanying drawings, which form a part of the present disclosure. The accompanying drawings show, by way of example, embodiments in which the present disclosure may be practiced. The illustrated embodiments are not intended to be exhaustive of all embodiments according to the present disclosure. It is to be understood that other embodiments may be utilized and structural or logical changes may be made without having to depart from the scope of the present disclosure. Accordingly, the detailed description is not limiting, and the scope of the present disclosure is defined by the appended claims.

Certain existing antenna feeds tend to bulky and have poor performance. The present disclosure in certain embodiment(s) provides a structure in which the shape of the medium support block is similar to that of a water cup, and the body of the cup is cylindrical. This water cup configuration likely removes the annular groove provided in the medium support block in certain existing technology, thereby reducing the structural risk and the risk of medium cracking caused by stress release, thereby reducing the processing difficulty and cost and improving the batch yield. In other words, the maximum diameter of the medium support block provided according to the present disclosure is not greater than twice the wavelength corresponding to the operating frequency at which the antenna feed works, which reduces the diameter of the material forming the medium support block and reduces the material cost of the feed; at the same time, the radiation performance of the antenna feed according to the present disclosure is also desirable.

In certain embodiment(s), in the medium support block in the present disclosure, in a longitudinal cross-section of the medium support block, the inner surface has at least a first wall segment, a second wall segment, and a third wall segment at one side of the longitudinal axis, where a distance of the second wall segment to the longitudinal axis is greater than a distance of the third wall segment to the longitudinal axis and is smaller than a distance of the first wall segment to the longitudinal axis, and where a first angle is defined between the first wall segment and the longitudinal axis, a second angle is defined between the second wall segment and the longitudinal axis, a third angle is defined between the third wall segment and the longitudinal axis, and the second angle is greater than the first angle and greater than the third angle.

In certain embodiment(s), the first wall segment is a first spline segment, the second wall segment is a second spline segment, and/or the third wall segment is a third spline segment.

In certain embodiment(s), the first angle is between a tangent of the first wall segment and the longitudinal axis, the second angle is between a tangent of the second wall segment and the longitudinal axis, and/or the third angle is between a tangent of the third wall segment and the longitudinal axis.

In certain embodiment(s), the first angle is within a first angle range, the second angle is within a second angle range, the third angle range is within a third angle range, a smallest angle within the second angle range is greater than a largest angle of the first angle range, and/or greater than a largest angle of the third angle range.

In certain embodiment(s), the medium support block is named or includes a dielectric support block.

Figure 2A:
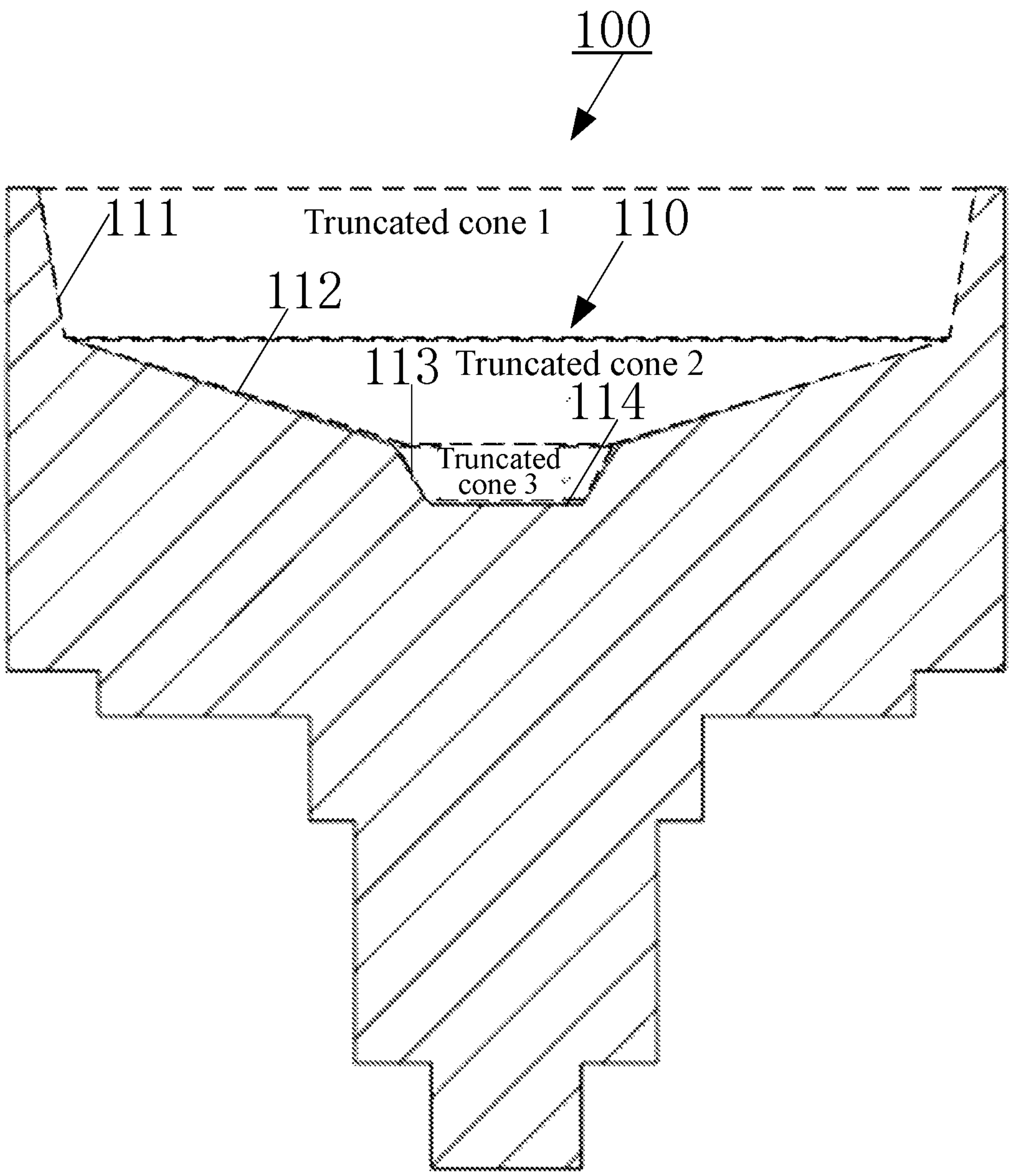
FIG. 2A shows a schematic structural view of an integrated structure of the medium support block 100 of FIG. 1 according to certain embodiment(s) of the present disclosure.
Figure 2B:
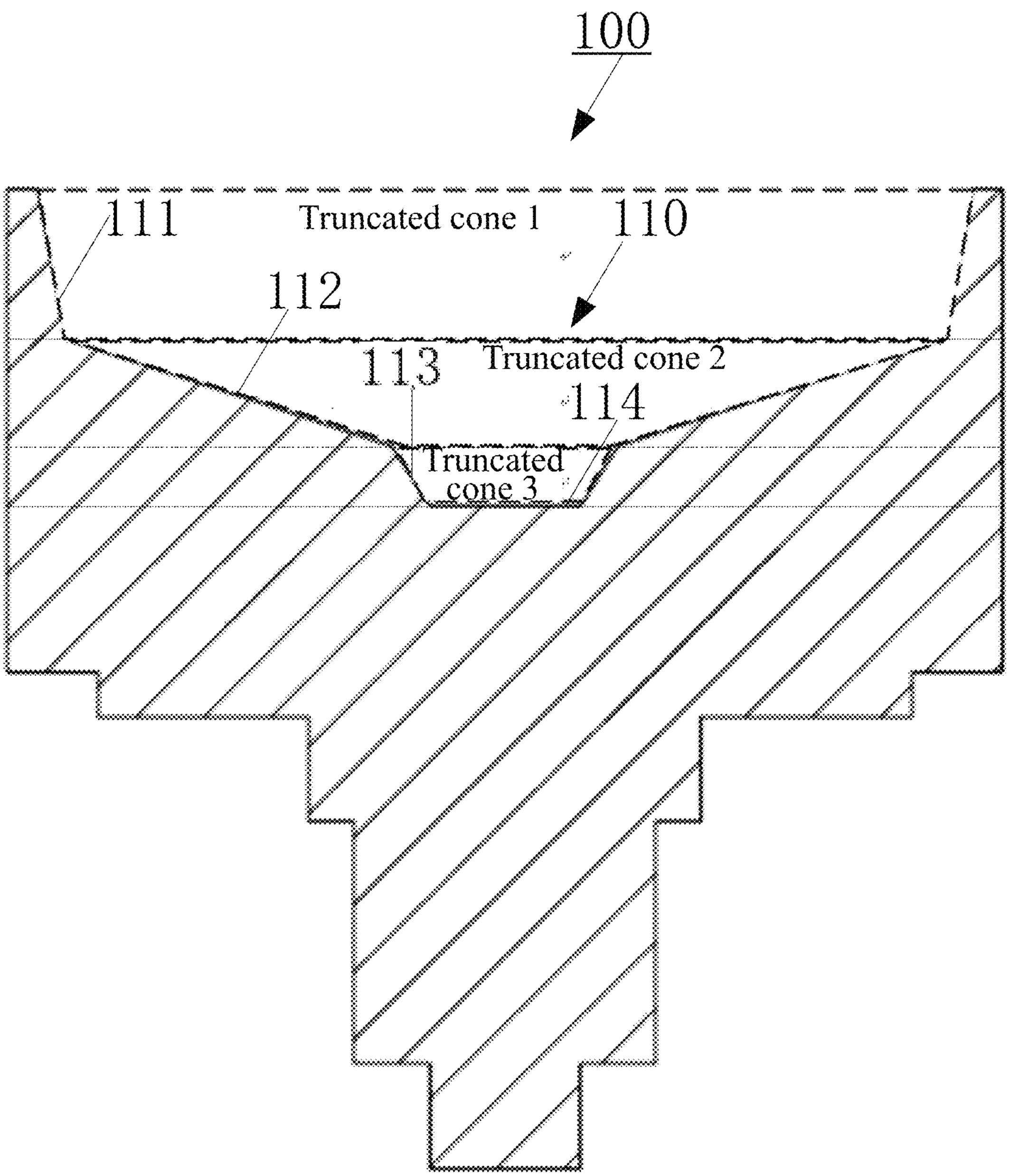
FIG. 2B shows a schematic structural view of a segmented structure of the medium support block 100 of FIG. 1 according to certain embodiment(s) of the present disclosure.

The medium support block disclosed according to certain embodiment(s) of the present disclosure is described below with reference to FIG. 1, FIG. 2A, and FIG. 2B. FIG. 1 shows a schematic structural diagram of a medium support block included in an antenna feed according to certain embodiment(s) of the present disclosure, FIG. 2A shows a schematic structural view of an integral structure of the medium support block of FIG. 1, and FIG. 2B shows a schematic structural view of a segmental structure of the medium support block of FIG. 1.

As shown in FIG. 1, in the longitudinal cross-section of the medium support block 100, that is, in the cross-section along the longitudinal axis 120, the inner surface 110 is located at an upper end in the direction shown in FIG. 1, there are at least a first wall segment 111, a second wall segment 112, and a third wall segment 113 at one side of the longitudinal axis 120 of the medium support block 100 (for example, on the left side of the direction shown in FIG. 1), where, the distance of the second wall segment 112 from the longitudinal axis 120 is greater than the distance of the third wall segment 113 from the longitudinal axis 120 and is smaller than the distance of the first wall segment 111 to the longitudinal axis 120, and where, the first angle ∠1 between the tangent of the first wall segment 111 and the longitudinal axis 120 is within the first angle range, the second angle ∠2 between the tangent of the second wall segment 112 and the longitudinal axes 120 is within the second angle range, and the third angle ∠3 between the tangent of the third wall segment 113 and the longitudinal axis 120 is within a third angle range, where the smallest angle ∠2 in the second angle range is greater than the maximum angle ∠1 in the first angle range and greater than the maximum angle ∠3 in the third angle range. In certain embodiment(s) shown in FIG. 1, the first wall segment 111, the second wall segment 112 and the third wall segment 113 are all shown as stepwise lines, representing cylindrical surface or conical surface in corresponding perspective view.

However, those skilled in the art should understand that the embodiment(s) shown by stepwise lines here are only exemplary and not restrictive. Those skilled in the art should understand that the first wall segment 111, the second wall segment 112, and the third wall segment 113 in the present disclosure may be at least partially curve or include a curve segment, such as the first wall segment 111 being a curve segment, while the second wall segment 112 and the third wall segment 113 are line segments; it is also possible, for example, that the second wall segment 112 is a curve segment, while the first wall segment 111 and the third wall segment 113 are line segments; or for example, the first wall segment 111 and the second wall segment 112 are curve segments, while the third wall segment 113 is a line segment.

In certain embodiment(s), at least one of the first wall segment 111, the second wall segment 112, and the third wall segment 113 includes or is a curve segment. In certain embodiment(s), the first wall segment 111, the second wall segment 112, and/or the third wall segment 113 include line segments or curve segments. In certain embodiment(s), the second wall segment 112 includes a plurality of line sub-segments. However, whether it is a curve segment or a line segment, the minimum angle ∠2 in the second angle range is greater than the maximum angle ∠1 in the first angle range and greater than the largest angle ∠3 in the third angle range.

In certain embodiment(s), as may also be seen from FIG. 1, a transverse cross-section of the medium support block 100 is circular or annular in shape. In certain embodiment (s), on an area outside where the inner surface 110 is located, that is, at an area below the bottom surface 114, the transverse cross-section of the medium support block 100 is circular in shape, correspondingly, above the area where the inner surface 110 is located, that is, at the area above the bottom surface 114, a transverse cross-section of the medium support block 100 is annular in shape, that is, a hollowed-out circular shape.

In certain embodiment(s), the first angle range includes an angle range from 0 degrees to 10 degrees, for example, an angle where ∠1 is 6 degrees. In certain embodiment(s), the third angle range includes an angle range from 0 degrees to 15 degrees, for example, an angle where ∠3 is 8 degrees. In certain embodiment(s), the second angle range includes an angle range from 20 degrees to 80 degrees, for example, an angle where ∠2 is 60 degrees.

In the antenna feed including the medium support block 100 according to the present disclosure, since the inner surface of the medium support block 100 is provided with at least three sections of wall shapes, and the smallest angle ∠2 in the second angular range is greater than the largest angle ∠1 in the first angular range and greater than the largest angle ∠3 in the third angular range, such that the inner surface 110 of the medium support block 100 is formed to be steep first, then sloped, and then steeper again. Such a shape arrangement reduces the size of the medium support block 100 while maintaining the signal transmission performance.

In certain embodiment(s), ∠1 may be zero degrees, that is, the first wall segment 111 may include a line parallel to the longitudinal axis 120, and where at this time, the surface corresponding to the first wall segment 111 is a cylindrical surface. In certain embodiment(s), ∠3 may also be zero degrees, that is, the third wall segment 113 may include a line parallel to the longitudinal axis 120, and where at this time, the surface corresponding to the third wall segment 113 is a cylindrical surface. But since the minimum angle ∠2 in the second angle range is larger than the maximum angle ∠1 in the first angle range and greater than the maximum angle ∠3 in the third angle range, the second wall segment 112 does not include a line parallel to the longitudinal axis 120, but is of a shape that slowly closes from top to bottom from the direction shown in FIG. 1. At this time, the surface corresponding to the second wall segment 112 is a conical surface. In certain embodiment(s), the inner surface 110 has a flat bottom surface 114, where an angle of the bottom surface 114 relative to the longitudinal axis is greater than the first angle, greater than the second angle, or greater than the third angle. In certain embodiment(s), the maximum diameter of the medium support block 100 is not greater than twice the wavelength corresponding to a working frequency where the antenna feed works.

At the second end of the medium support block, for example, the lower end shown in FIG. 1, the second end is processed into a cylindrical plug suitable for insertion into other components such as a waveguide. Assembly method of the second end is described below in view of FIG. 3.

In order to further illustrate the structural form of the medium support block 100, FIG. 2A shows a schematic structural view of an integral structure of the medium support block of FIG. 1, and FIG. 2B shows a schematic structure view of a segmented structure of the medium support block of FIG. 1.

It may be seen from FIG. 2A that the medium support block 100 shown in FIG. 1 may be integrally formed, that is to say, the three wall segments are integrally formed during processing, that is, an independent integral member, rather than being assembled from multiple parts. Such an integrally formed structure delivers higher structural strength and increases the structural stability of the medium support block 100 according to certain embodiment(s) of the present disclosure.

In certain embodiment(s), it may be seen from FIG. 2A that in the medium support block 100 in the present disclosure, at one side of the longitudinal cross-section of the medium support block 100, the inner surface 110 has at least a first wall segment 111, a second wall segment 112, and a third wall segment 113, where, the distance between the second wall segment 112 and the longitudinal axis is greater than the distance between the third wall segment 113 and the longitudinal axis, and smaller than the distance between the first wall segment 111 and the longitudinal axis, and where the first angle between the tangent of the first wall segment 111 and the longitudinal axis is within a first angle range, the second angle between the tangent of the second wall segment 112 and the longitudinal axis is within a second angle range, and the third angle between the tangent of the third wall segment 113 and the longitudinal axis is within a third angle range, where, the smallest angle in the second angle range is greater than the largest angle in the first angle range and the third angle range. Further in view of FIG. 2A, and in certain embodiment(s), the truncated cones 1, 2 and 3 and other parts of the medium support block 100 are integrally constructed components rather than assembled from separately constructed discrete components. Such configuration improves the structural stability of the medium support block 100 according to the present disclosure.

Different from the overall integral structure, FIG. 2B shows a schematic structural view of the segmented structure of the medium support block according to certain embodiment(s) of FIG. 1. As may be seen from FIG. 2B, the medium support block 100 shown in FIG. 1 may be constructed separately and then assembled, that is to say, the three wall segments shown in FIG. 2B as three truncated cones, that is, the truncated cone 1, the truncated cone 2, and the truncated cone 3 are each an independent component, and the medium support block 100 is formed by assembling a plurality of parts. As shown in FIG. 2B, divisions may be made from the position shown by the dotted line, that is, for example, divisions may be made to form at least four parts, and then the parts are assembled, for example, by means of adhesive, or metallic welding, or the like, such that adhesive polymers or welding metals may be present between the first and the second wall segments, and/or between the second and the third wall segments. In certain embodiment(s), the first wall segment is connected to the second wall segment with a glue or a welding metal. Such a division/assembly structure is beneficial to processing efficiency and processing accuracy, and may realize enhanced signal transmission performance.

In certain embodiment(s), it may be seen from FIG. 2B that in the medium support block 100, at one side of the longitudinal cross-section of the medium support block 100, the inner surface 110 has at least a first wall segment 111, a second wall segment 112, and a third wall segment 113, where the distance between the second wall segment 112 and the longitudinal axis is greater than the distance between the third wall segment 113 and the longitudinal axis, and smaller than the distance between the first wall segment 111 and the longitudinal axis, and where the first angle between the tangent of the first wall segment 111 and the longitudinal axis is within a first angle range, and the second angle between the tangent of the second wall segment 112 and the longitudinal axis is within a second angle range, and the third angle between the tangent of the third wall segment 113 and the longitudinal axis is within a third angle range, where the smallest angle in the second angle range is greater than the largest angle in the first angle range and the third angle range. Further in view of FIG. 2B, and in certain embodiment(s), the truncated cones 1, 2, and 3 and other parts of the medium support block 100 may be independent components constructed separately. That is, assembly is made from discrete parts that are constructed separately. Such a configuration improves the processing efficiency and processing accuracy of the medium support block 100 according to the present disclosure, and realizes enhanced signal transmission performance. It may be seen from FIG. 2B that the parts of the different wall segments of the medium support block 100 are respectively constructed as independent components. Those skilled in the art should understand that the medium support blocks may be constructed independently of each other and then assembled; and they may also be constructed integrally.

In certain embodiment(s), the medium support block 100 is formed by compilation of several cylinders with different thicknesses and different diameters (where the inner surfaces of several cylinders at upper level are, for example, of conical surfaces), and the cylinder at the uppermost end has the largest diameter, the largest diameter is less than or equal to 2 times the wavelength of the working frequency. In certain embodiment(s), the uppermost cylinder of the medium support block 100 is provided with an inwardly concave inner surface, and the inner surface is formed by compilation of at least three truncated cones that may be funnel-shaped, namely the truncated cone 1, the truncated cone 2, and the truncated cone 3. The diameter of the upper bottom surface of each truncated cone is not smaller than the diameter of the lower bottom surface, and the maximum diameter of the bottom surface of each truncated cone is smaller than the diameter of the cylinder. In certain embodiment(s), for the cross-section sides of each truncated cones or the above-mentioned wall segments, the angles between the above-mentioned wall segments and the central axis are ∠1, ∠2, and ∠3, each angle falls within the following angle range: 0° (degrees)<∠1<10°, 50°<∠2<80°, 0°≤∠3≤15°. As shown in FIG. 2B, the truncated cone 1, the truncated cone 2, and the truncated cone 3 may respectively be split into a plurality of compilated truncated cones of similar shape. However, the angles between the central axis and the cross-section sides of the plurality of split truncated cones also satisfy the above angle range.

Figure 3:
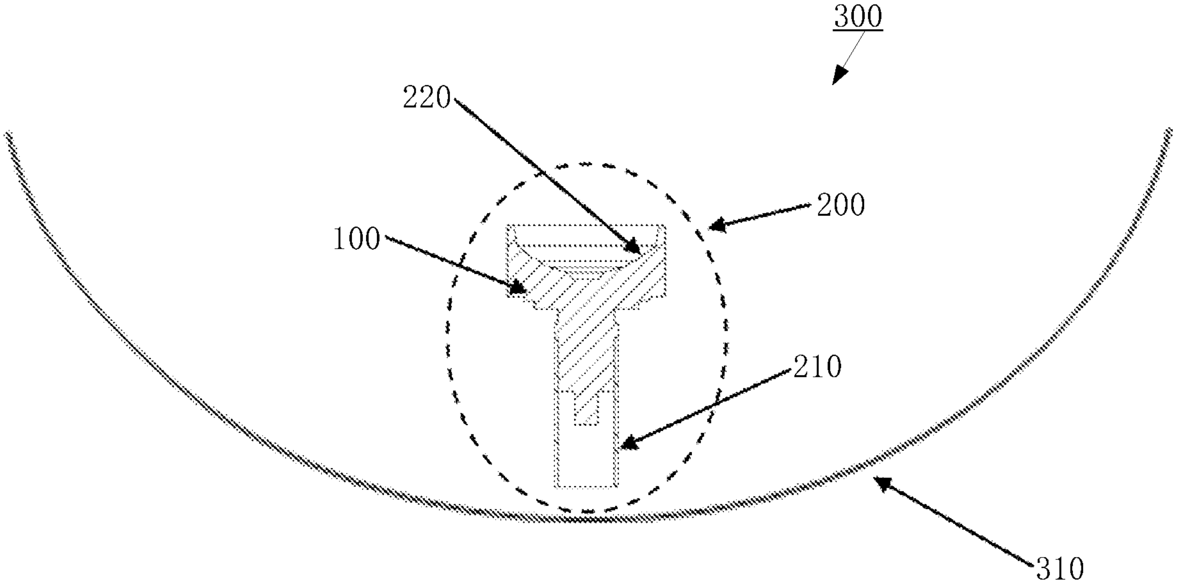
FIG. 3 shows a schematic structural diagram of an antenna 300 according to certain embodiment(s) of the present disclosure.

FIG. 3 shows a schematic structural diagram of an antenna according to certain embodiment(s) of the present disclosure. As may be seen from FIG. 3, the antenna feed 200 according to the present disclosure includes the following components:

- a waveguide 210, configured to electrically connect a signal to be transmitted;
- a medium support block 100, a first end of the medium support block 100 being connected to the waveguide, and an a second end of the medium support block defines an inner surface 110, the medium support block 100 having a longitudinal axis; and
- a reflective surface 220, the reflective surface 220 being configured to contact the inner surface 110,
- where in a longitudinal cross-section of the medium support block 100, the inner surface 110 has at least a first wall segment 111, a second wall segment 112, and a third wall segment 113 at one side of the longitudinal axis, where a distance of the second wall segment 112 to the longitudinal axis is greater than a distance of the third wall segment 113 to the longitudinal axis and is smaller than a distance of the first wall segment 111 to the longitudinal axis, and where a first angle is defined between the first wall segment 111 and the longitudinal axis, a second angle is defined between the second wall segment 112 and the longitudinal axis, a third angle is defined between the third wall segment 113 and the longitudinal axis, and the second angle is greater than the first angle and greater than the third angle.

In some embodiments, the first end of the medium support block 100 is smaller than the second end opposite to the first end. In some embodiments, the inner surface 110 of the second end is concave. In certain embodiment(s), the inner surface 110 is symmetrical about the longitudinal axis.

In the antenna feed according to the present disclosure, at least three sections of wall shapes are set on the inner surface of the medium support block 100, and a smallest angle in the second angle range is greater than a largest angle in the first angle and in the third angle range, such that the inner surface 110 of the medium support block 100 is formed to be steep first, then sloped, and then steeper again, such that the inner surface 110 of the medium support block 100 is formed to be steep first, then sloped, and then steeper again. Such a shape arrangement reduces the size of the medium support block 100 while maintaining the signal transmission performance.

In certain embodiment(s), the reflective surface 220 includes a metal or is made of metal material. In this manner, on the one hand, the structural strength of the antenna feed may be enhanced, and on the other hand, the signal transmission performance of the antenna feed may also be improved. In certain embodiment(s), the reflective surface 220 may also include, for example, a base material, and the upper surface of the base material is coated with a metal material to form the reflective surface 220.

In certain embodiment(s), and as shown in FIG. 3, the antenna 300 according to the present disclosure includes: the antenna feed 200 described above according to the present disclosure, that is, the part shown within the dotted line box in FIG. 3; and the main reflection surface 310, the main reflection surface 310 is configured to be of a hemispherical shape, and the antenna feed 200 is configured at the center of the hemispherical main reflection surface 310.

In certain embodiment(s), the antenna 300 further includes a radio frequency connector (not shown in the drawings), and the radio frequency connector is configured to be connected to the antenna feed 200 and to be connected to the antenna feed 200 via the signal emitted by the antenna 300 through the radio frequency connector. In certain embodiment(s), the reflective surface of the antenna feed, commonly referred to as the ancillary reflective surface 220, is realized by electroplating metal or electroplating metal paint on the inner surface 110, or placing a metal block that fits the concave surface. In certain embodiment(s), the antenna 300 is configured as a feed-back reflector antenna.

Figure 4:
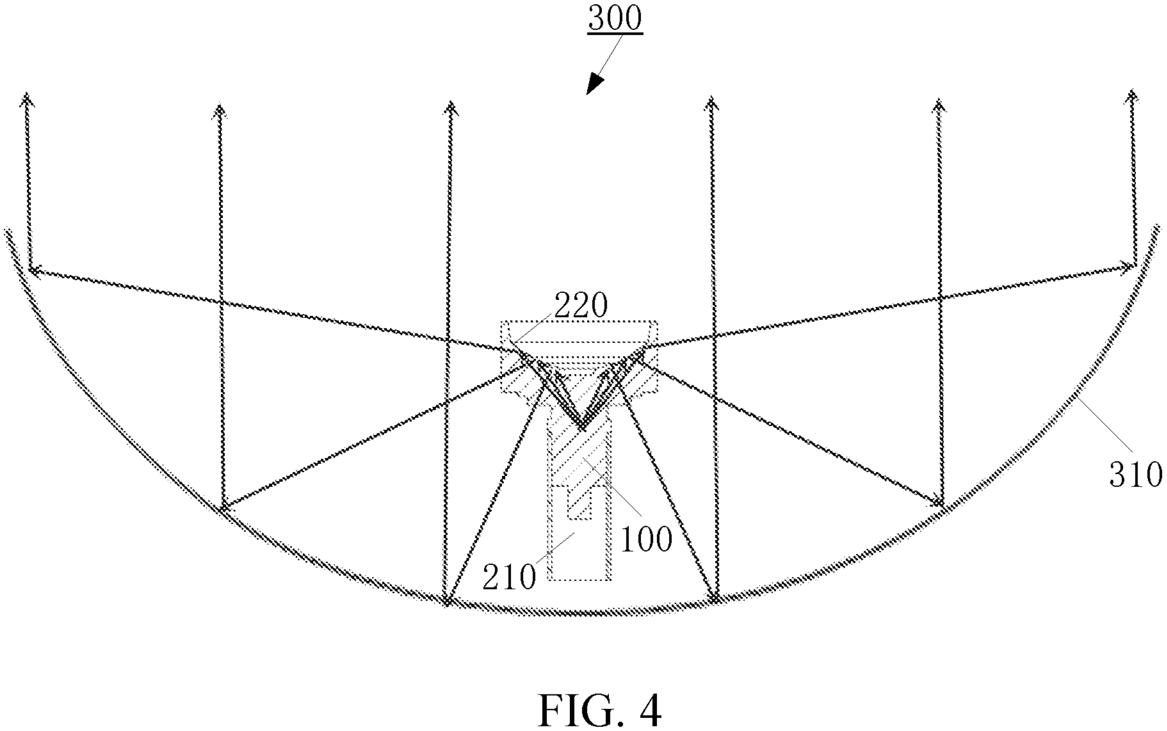
FIG. 4 shows a schematic diagram of a signal transmission path of the antenna 300 of FIG. 3 according to certain embodiment(s) of the present disclosure.

Further, the antenna feed 200 according to the present disclosure is adopted to form the back-feed reflector antenna scheme composed of the main reflective surface 310 corresponding to the structural curve, which may improve the radiation efficiency of the reflector antenna 300 and the radiation pattern of the antenna may satisfy package details of ETSI Class3/4 standard. Certain aspects of working principle are shown in FIG. 4, and FIG. 4 shows a schematic diagram of a signal transmission path of the antenna of certain embodiment(s) shown in FIG. 3. It may be seen from FIG. 4 that the antenna 300 is fed through one end of the circular waveguide 210, a spherical wave is emitted from the other end thereof, and the spherical wave passes through the medium support block 100 and the metal ancillary reflective surface 220 on the medium support block 100, and distributes electromagnetic wave evenly onto the main reflective surface 310, and finally through a secondary reflection via the main reflective surface 310, to form plane waves of equal amplitude and phase on the antenna aperture, thereby to greatly improve radiation efficiency of the main reflective surface 310.

In certain embodiment(s), in the antenna feed 200 according to the present disclosure, since the inner surface 110 of the medium support block 100 is provided with at least three sections of wall shapes, and the smallest angle in the second angular range is greater than the largest angle in the first angular range and greater than the largest angle in the third angular range, such that the inner surface of the medium support block 100 is formed to be steep first, then sloped, and then steeper again. Such a shape arrangement reduces the size of the medium support block 100 while maintaining the signal transmission performance.

While certain embodiments of the present disclosure have been described, various changes and modifications may be made, which may be made without having to depart from the spirit and scope of the present disclosure to realize one or some of the advantages of the present disclosure. Other components performing the same function may be appropriately substituted for those skilled in the art. It shall be understood that features explained here with reference to a particular drawing may be combined with features of other drawings, even in those situations where this is not explicitly mentioned. Furthermore, the methods of the present disclosure may be implemented either in all software implementations using appropriate processor instructions or in hybrid implementations utilizing a combination of hardware logic and software logic to achieve the same results. Such modifications to the arrangements according to the present disclosure are intended to be covered by the appended claims.

What is claimed is:

1. An antenna feed, comprising:

a waveguide, configured to electrically connect a signal to be transmitted;

a medium support block, a first end of the medium support block being connected to the waveguide, and a second end of the medium support block having a concave inner surface, the medium support block having a longitudinal axis, the inner surface monotonically progresses inward toward a bottom in an axial direction as the inner surface extends radially from a periphery toward the longitudinal axis; and a reflective surface configured to contact the inner surface, wherein:

in a longitudinal cross-section of the medium support block, the inner surface has at least a first wall segment, a second wall segment, and a third wall segment at one side of the longitudinal axis, a distance of the second wall segment to the longitudinal axis is greater than a distance of the third wall segment to the longitudinal axis and is smaller than a distance of the first wall segment to the longitudinal axis, the third wall segment is connected to the second wall segment at one end of the second wall segment, the first wall segment is connected to the second wall segment at an other end of the second wall segment, and a first angle is defined between the first wall segment and the longitudinal axis, a second angle is defined between the second wall segment and the longitudinal axis, a third angle is defined between the third wall segment and the longitudinal axis, and the second angle is greater than the first angle and greater than the third angle.

2. The antenna feed according to claim 1, wherein the first angle is within a first angle range, and the first angle range includes an angle range from 0 degrees to 10 degrees.

3. The antenna feed according to claim 1, wherein the third angle is within a third angle range, and the third angle range includes an angle range from 0 degrees to 15 degrees.

4. The antenna feed according to claim 1, wherein the second angle is within a second angle range, and the second angle range includes an angle range of 20 degrees to 80 degrees.

5. The antenna feed according to claim 1, wherein a transverse cross-section of the medium support block is circular or annular.

6. The antenna feed according to claim 1, wherein the inner surface has a planar bottom surface.

7. The antenna feed according to claim 1, wherein a maximum diameter of the medium support block is not greater than twice the wavelength corresponding to a working frequency band where the antenna feed works.

8. The antenna feed according to claim 1, wherein the first, the second, and third wall segments of the medium support block are respectively constructed as independent components.

9. The antenna feed according to claim 1, wherein the reflective surface includes a metal.

10. The antenna feed according to claim 1, wherein the second wall segment comprises a plurality of wall sub-segments.

11. The antenna feed according to claim 1, wherein the first wall segment, the second wall segment, and/or the third wall segment comprise a line segment or a curve segment.

12. The antenna feed according to claim 1, wherein the first end of the medium support block is smaller than the second end opposite to the first end.

13. The antenna feed according to claim 1, wherein the inner surface is symmetrical about the longitudinal axis of the medium support block.

14. The antenna feed according to claim 1, wherein the inner surface includes a transition from a steep slope to a shallower slope, and then to another steep slope as the inner surface extends radially from the periphery toward the longitudinal axis.

15. An antenna, comprising:

an antenna feed; and a main reflection surface, wherein the main reflection surface includes a curved surface, and the antenna feed is positioned at the curved surface of the main reflection surface;

wherein the antenna feed comprises:

a waveguide, configured to electrically connect a signal to be transmitted;

a medium support block, a first end of the medium support block being connected to the waveguide, and a second end of the medium support block having a concave inner surface, the inner surface monotonically progresses inward toward a bottom in an axial direction as the inner surface extends radially from a periphery toward the longitudinal axis; and a reflective surface configured to contact the inner surface, wherein:

in a longitudinal cross-section of the medium support block, the inner surface has at least a first wall segment, a second wall segment, and a third wall segment at one side of the longitudinal axis, a distance of the second wall segment to the longitudinal axis is greater than a distance of the third wall segment to the longitudinal axis and is smaller than a distance of the first wall segment to the longitudinal axis, the third wall segment is connected to the second wall segment at one end of the second wall segment, the first wall segment is connected to the second wall segment at an other end of the second wall segment, and a first angle is defined between the first wall segment and the longitudinal axis, a second angle is defined between the second wall segment and the longitudinal axis, a third angle is defined between the third wall segment and the longitudinal axis, and the second angle is greater than the first angle and greater than the third angle.

16. The antenna according to claim 15, wherein the main reflection surface is configured as a hemisphere surface.

17. The antenna according to claim 15, wherein the antenna feed is positioned at a center of the main reflection surface.

18. The antenna according to claim 15, wherein the reflective surface of the antenna feed includes a metal.

19. The antenna according to claim 15, wherein the antenna is configured as a feed-back reflector antenna.

* * * * *